(12) United States Patent
Naqvi

(10) Patent No.: US 8,566,314 B2
(45) Date of Patent: Oct. 22, 2013

(54) SYSTEM AND RELATED TECHNIQUES FOR DETECTING AND CLASSIFYING FEATURES WITHIN DATA

(75) Inventor: Waseem Naqvi, Marlborough, MA (US)

(73) Assignee: Raytheon Company, Waltham, MA (US)

( * ) Notice: Subject to any disclaimer, the term of this patent is extended or adjusted under 35 U.S.C. 154(b) by 1123 days.

(21) Appl. No.: 12/062,896

(22) Filed: Apr. 4, 2008

(65) Prior Publication Data

US 2010/0287161 A1    Nov. 11, 2010

Related U.S. Application Data

(60) Provisional application No. 60/910,278, filed on Apr. 5, 2007.

(51) Int. Cl.
*G06F 7/00* (2006.01)
*G06F 17/30* (2006.01)

(52) U.S. Cl.
USPC ............ 707/736; 707/914; 707/915; 707/916

(58) Field of Classification Search
USPC .......... 707/736, 741, 999.107, 913, 914, 915, 707/916
See application file for complete search history.

(56) References Cited

U.S. PATENT DOCUMENTS

| 7,327,885 | B2* | 2/2008 | Divakaran et al. | 382/190 |
| 7,596,763 | B2* | 9/2009 | Sullivan et al. | 715/836 |
| 7,606,425 | B2* | 10/2009 | Bazakos et al. | 382/224 |
| 2004/0240542 | A1 | 12/2004 | Yeredor et al. | |
| 2006/0253491 | A1* | 11/2006 | Gokturk et al. | 707/104.1 |
| 2008/0126191 | A1* | 5/2008 | Schiavi | 705/14 |
| 2009/0091798 | A1* | 4/2009 | Lawther et al. | 358/3.28 |

FOREIGN PATENT DOCUMENTS

| WO | WO 99/41684 | 8/1999 |
| WO | WO 03/049430 | 6/2003 |

OTHER PUBLICATIONS

International Search Report for PCT/US2008/059403 dated May 15, 2009.
Written Opinion of the International Searching Authority; PCT/US2008/059403 dated May 15, 2009.
PCT International Preliminary Examination Report dated Oct. 15, 2009 for PCT/US2008/059403 filed on Apr. 4, 2008; 7 pages.

* cited by examiner

*Primary Examiner* — Marc Somers
(74) *Attorney, Agent, or Firm* — Daly, Crowley, Mofford & Durkee, LLP

(57) ABSTRACT

An information processing system and method for gathering and interpreting information includes capturing information from at least one of a plurality of information streams/sensors wherein the information includes video, audio, seismic, radio frequency (RF), and/or text then applying a standardized tag to an event at a predetermined time or over a predetermined period of time and storing the standardized tag in a repository which can be interrogated rapidly for situation/scene understanding. The information processing system and method include providing a plurality of segmentation algorithms, determining the type of information to be processed and selecting one or more of the segmentation algorithms to process the information based upon the type of information to be processed.

16 Claims, 6 Drawing Sheets

SYSTEM AND RELATED TECHNIQUES FOR DETECTING AND CLASSIFYING FEATURES WITHIN DATA

CROSS REFERENCE TO RELATED APPLICATIONS

This application claims the benefit under 35 U.S.C. §119(e) of provisional application No. 60/910,278, filed on Apr. 5, 2007, which application is incorporated herein by reference in its entirety.

FIELD OF THE INVENTION

This invention relates to a data processing system and more particularly to a system and related techniques for receiving different types of data and for detecting and classifying features within the data.

BACKGROUND OF THE INVENTION

As is known in the art, homeland security, urban operations and intelligence applications all have a need for technology which allows the searching of large amounts of information. After subway bombings in London England occurred in 2005, for example, there was a need to review hours of video from several thousand surveillance cameras. This was a relatively difficult task made even more difficult and tedious because it had to be done manually. In order to ease the burden of such a task, there is an effort underway with Moving Picture Experts Group (MPEG) "Multimedia Content Description Interface" standard (MPEG-7) to tag scenes of video with metadata.

In today's world where the asymmetric warfare threat is real (i.e. the enemy adjusts its tactics to neutralize intrusion detection systems), video surveillance is a key asset. These video surveillance systems however, generate large amounts of video that need to be monitored and searched for an event or person of interest. There are new multi media standards, such as MPEG-7 which provide the needed functionality to transmit objects and metadata. Thus, one challenge will be to analyze large streams and stored data for information (e.g. incidents) of interest.

So-called "Homeland Defense" and "Homeland Security" solutions will require knowledge-assisted content analysis and annotation in order to mitigate new threats and challenges posed in net-centric warfare. State of the art intelligent video systems today use digital signal processor (DSP) chipsets with proprietary software in order to detect objects and associate alarms with predefined events. While such an approach is acceptable, its intended use is as an alarm situation for abnormal object detection in a command room scenario. It does not facilitate real correlation or forensic examination of a scene or set of scenes.

SUMMARY OF THE INVENTION

To overcome the above limitation, an information stream metadata tagging architecture and system is used. This involves capturing information from various information streams/sensors (e.g. video, audio, seismic, radio frequency or "RF," etc), and or text, and applying a tag (i.e. a descriptor) to either a feature identified in the data or an event identified in the data. Tags are applied automatically by the system once an object or an event is detected by the system. Tags may be applied manually if an operator wishes to annotate an object or an event. If the data is image data, for example, a feature identified in the data may be a particular object identified in the image (e.g. a white car in an image of a building parking lot). An example of an event identified in the image data may be information gathered from one or more images in a video stream (e.g. a white car leaving a parking lot). The data may also be identified as occurring at a particular time or within a particular time period (e.g. data collected between 6 pm and 6 am on a specific date).

In one embodiment, each tag may correspond to one of a plurality of standardized tags. For example, if the data being provided to the system is known to be video from a security camera of a building parking lot, then some standard tags of objects may be: "car," "person," "motorcycle," etc. . . . . Some standard tags for events may be: "car leaving parking lot," "car entering parking lot," "person leaving building," "person entering building," etc. . . . . Other standard tags for both objects and events may, of course, also be used.

In a preferred embodiment, the tags are automatically associated with the data being processed and to which the tag applies. In some embodiments, the tags may be manually associated with the data being processed.

Time and date information is also associated with the data. This helps make it possible to query the data in a manner which is useful should it be desirable to identify features or events which occurred at a particular time or within a particular period of time (sometimes referred to herein as a "validity period"). In one embodiment, the tag (or meta data) may be provided during a data segmentation process.

After the meta data is generated, it is stored in a repository. By storing the meta data in the repository rather than storing the raw data itself in the repository, the repository can be interrogated rapidly for situation/scene understanding. With such a system, it is possible to form queries such as "find all information streams which include a white van at 10 AM on January 19th."

It should be appreciated that various tagging technologies such as those provided by TECH/REP INC. OBJECT VIDEO, and IOIMAGE may be used and ontology extensions of such tags (video, audio, textual, etc) may be added. The tags and events (i.e. car drives through gate) will be stored in a repository which may be provided, for example, as a database (e.g. an ORACLE R2 database). The ontology may be utilized to detect abnormal states and allow for forensic analysis of prior events for cause and actors. In one embodiment, the system accepts video input (e.g. from a video surveillance system) and processes the data fed thereto (e.g. the video images) in such a manner that it may be used to: (a) conduct forensic analysis of the information (who was involved, where actors were) and (b) predict behavioral anomalies (incident may be in formation). This is a simple, but very important idea that can be applied to homeland security and command and control (C2) campaigns such as Perimeter Intrusion Detection System (PIDS), Net Enabled Operations (NEO) and Persistent Surveillance and Dissemination System of Systems (PSDS2).

In accordance with a further aspect of the invention, an information stream metadata tagging architecture and system (as well as related techniques) is used to process information. This involves capturing information from various information streams/sensors (video, audio, seismic, RF, etc), and or text, and automatically applying a standardized tag to an object or an event. In one embodiment, the metadata is provided during an information stream segmentation process. The metadata is stored in a repository, which can be interrogated rapidly for situation/scene understanding. With such a system it is possible to form queries such as "find all information streams including a white van at 10 AM on January 19th." This approach solves a need in homeland security applications, urban operations applications, and intelligence applications.

In accordance with a still further aspect of the present invention, a method comprises capturing information from various information streams/sensors (video, audio, seismic, RF, etc), and or text, and applying a standardized tag to a feature or an event in the data at a desired point in time or over desired period of time (e.g. a so-called "validity period"). The method further comprises storing the standardized tags in a tag repository, which can be interrogated rapidly for situation/scene understanding. With this particular technique, it is possible to form queries such as "find all information streams including a white van at 10 AM on January 19$^{th}$." Thus the system provides the ability to automatically process the input stream (video) and recognize objects and events and tag the fact that they were recognized at a certain location and time.

The techniques of the present invention are useful in a large number of diverse applications including but not limited to homeland security, urban operations, and intelligence. In order to provide such a system, trade studies of various tagging technologies such as those provided by TECH/REP INC, OBJECT VIDEO, and IOIMAGE are used to identify optimal tagging technologies. An ontology of such tags (video, audio, textual, etc. . . . ) will also be used. In one embodiment, the system reviews scenes in a video sequence for known objects and events, and automatically at the same time generates tags for the recognized objects and events. The tags and events will be stored in a repository (e.g. an ORACLE 10g R2). In determining which algorithms to use to analyze the data, it is important to know the kinds of analysis needed to determine: (a) forensic information (who was involved, where actors were) and (b) future behavioral anomalies (incident may be in formation). Analysis could include the following: identify motion events, people in scene/no people in scene, many people in scene (groups, crowd), vehicles in scene (car, van, truck, etc), tracking within a security zone, and handoff between sensors. Additionally the system tracks and stores events such as vehicles leaving a security zone and optionally provide alerts if they re-enter within a selected time period e.g. 7 days. The ability to automatically parse a video stream and recognize objects and/or events, and then build an index of tags so that any scenes that contain any objects or events being searched for can be rapidly retrieved. Thus, the system and techniques finds particular application in homeland security and C2 campaigns such as critical infrastructure and/or perimeter intrusion detection. It may be the foundation of future surveillance scene understanding technologies.

In accordance with a still further aspect of the present invention, a data processing system comprises a segmentation system adapted to receive data and capable of performing, among other things, object recognition (e.g. computer vision, image processing, image analysis, pattern recognition, recognition, identification, detection, machine vision, etc. . . . ). The segmentation system includes: (a) a storage device having a plurality of different feature extraction techniques stored therein; (b) a feature extraction processor in communication with said storage device, the feature extraction processor adapted to execute at least each of the plurality of different feature extraction techniques stored in the storage device and adapted to extract one or more features from the data provided to the segmentation system; and (c) a feature extraction technique selector which selects one or more of the plurality of different feature extraction techniques based upon the type of data provided to the segmentation system. The system further includes a feature classifier adapted to receive one or more features from the segmentation system and to apply a feature tag to each of the features; a repository adapted to receive feature tags from the feature classifier; a search engine coupled to said repository and a user interface coupled to the search engine.

In some embodiments, the segmentation system is provided as an image segmentation system, the storage device is provided as a memory, the plurality of different feature extraction techniques stored in the memory are provided as image feature extraction techniques, the segmentation processor is provided as an image segmentation processor adapted to execute a plurality of different image feature extraction techniques, the object classifier is adapted to receive one or more image segments from said image segmentation processor and the object repository is provided as a database.

In accordance with a still further aspect of the present invention, a system comprises an image segmentation system including: (a) a storage device having a plurality of different feature extraction techniques stored therein; (b) an image segmentation processor in communication with said storage device, said image segmentation processor adapted to execute at least each of the plurality of different image segmentation algorithms stored in said storage device; an object classifier adapted to receive one or more image segments from said image segmentation processor and to apply a tag to each object in each of the image segments; an object repository adapted to receive object tags from said object classifier; a search engine coupled to said object repository; and a user interface coupled to said search engine.

In accordance with yet a further aspect of the present invention, a method comprises capturing information from at least one of a plurality of information streams/sensors wherein the information includes is not limited to video, audio, seismic, RF, and/or text; applying a standardized tag to an event at a predetermined time or over a predetermined period of time (i.e. a validity period); and storing the standardized tag in a repository which can be interrogated rapidly for situation/scene understanding.

In accordance with a yet still further aspect of the present invention, an information processing method comprises providing a plurality of segmentation algorithms; determining the type of information to be processed; and selecting one or more of the segmentation algorithms to process the information based upon the type of information to be processed.

In accordance with a yet still further aspect of the present invention, a method for processing data comprises selecting a portion of the data, identifying one or more specific features within the selected portion of the data, applying a feature tag to each of the specific features which have been identified, and storing each of the feature tags in a repository.

In one embodiment, the method further comprising applying an event tag to the selected portion of the data.

In one embodiment, the applying an event tag to the selected portion of the data comprises one of (a) manually applying an event tag to the selected portion of the data; or (b) automatically applying an event tag to the selected portion of the data.

BRIEF DESCRIPTION OF THE DRAWINGS

The foregoing features of this invention, as well as the invention itself, may be more fully understood from the following description of the drawings in which.

DETAILED DESCRIPTION OF THE PREFERRED EMBODIMENTS

Figure 1:
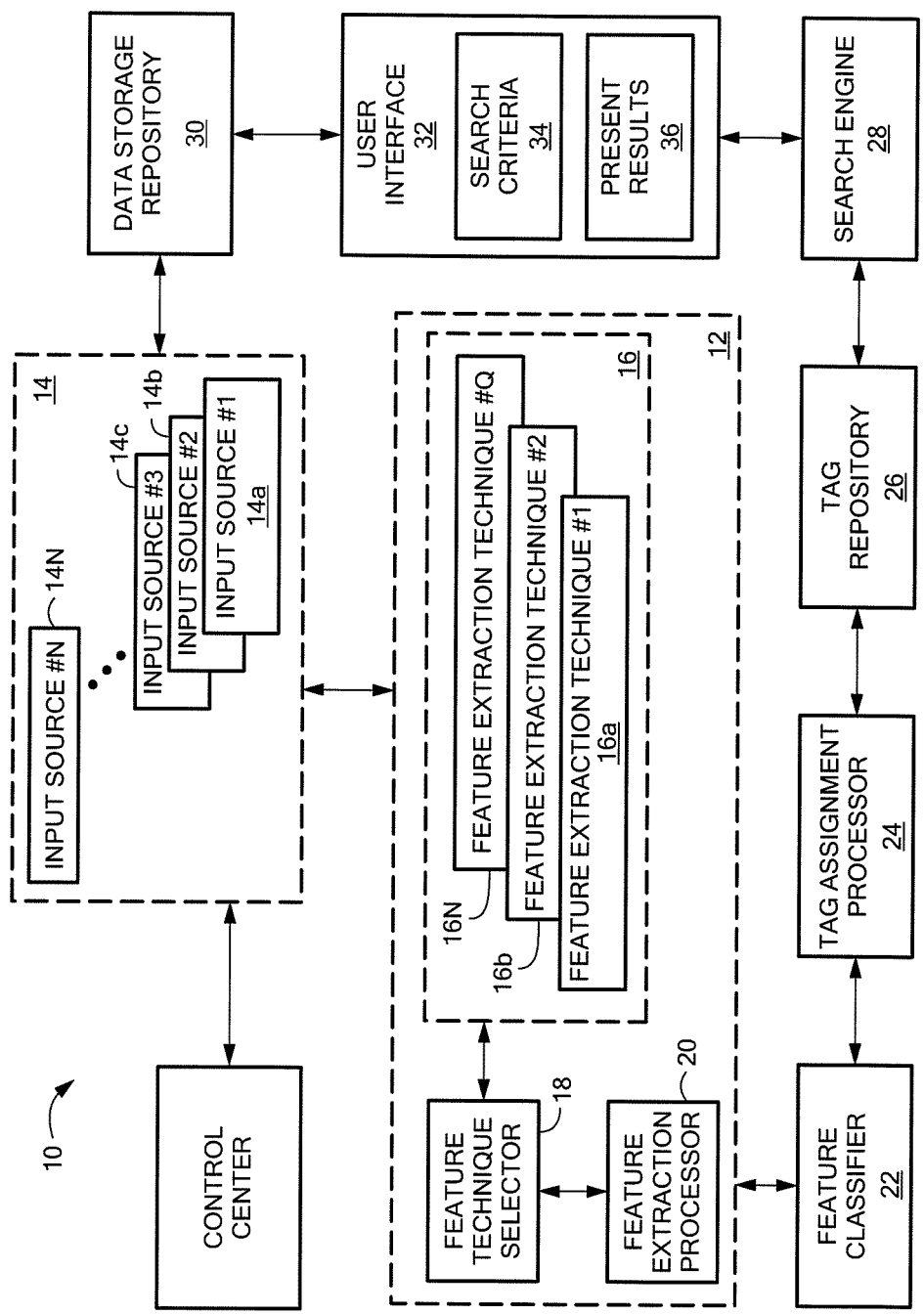
FIG. 1 is a block diagram of a system for detecting and classifying features within data and storing a feature identifier in a repository.

Referring now to FIG. 1, a system for processing data 10 includes a segmentation system 12 which receives input data from a plurality of input sources 14a-14N, generally denoted 14. The input sources may be any type of sources including but not limited to image sources (including but not limited to video cameras, still cameras) audio sources (e.g. microphones), scanning devices (e.g. X-ray or magnetic resonance imaging devices, computed tomography or "CT" scanners), or any other type of sensor or source capable of detecting data.

The segmentation system 12 includes a plurality of different feature extraction techniques 16a-16N, generally denoted 16 and a feature technique selector 18. Based upon the type of data provided to the segmentation system, the feature technique selector 18 automatically selects an appropriate one (or ones) of the plurality of feature extraction techniques to process the data provided to the segmentation system. Thus, if an input source 14 provides video data to the segmentation system 12, the feature technique selector 18 selects an appropriate video signal processing technique to process the data (the input stream is characterized and processed by a suitable sub-system e.g. video (daylight, infrared, hyper-spectral), and audio). It should be appreciated that several video signal processing techniques may be available for use and the feature technique selector selects an appropriate one of the processing techniques. The particular technique selected by the feature technique selector is based upon a variety of factors including but not limited to: (1) the type of input to be processed (e.g. video signals, audio signals, still images, data from CT, X-ray or Magnetic Resonance Imaging or "MRI" scanners); (2) whether it is desirable to detect a particular feature within the data being processed; (3) whether the data has a known characteristic which dominates the data; and (4) the type of data being processed (e.g. media files, text files/streams). For example, if night time video is being processed, then it may be desirable for the feature technique selector 18 to select a processing technique which effectively processes night time images since darkness will be a dominant characteristic in the video. On the other hand, if day time video is being processed, then it may be desirable to use another processing technique.

Once the feature technique selector 18 selects one or more of the feature extraction techniques 16, a feature extraction processor 20 executes the technique and processes the input data. The feature extraction processor operates to identify all features in the data. For example, if the data is an image, then the feature extraction processor 20 operates to identify all objects within the image. For example if the image is a scene of a parking lot, then the feature extraction processor operates to identify all vehicles in the image (e.g. a white van, a blue sedan, a red convertible) as well as anything else in the image (e.g. light posts, buildings, doors, people, animals, backpacks, etc. . . . ). In short, the feature extraction processor operates to identify all features in the data (e.g. objects in an image) as will technology will allow. That is, limitations in processing power, algorithm effectiveness, etc. . . . may affect the ability of the feature extraction processor 20 to identify all features in a data set provided thereto.

Once the features in the data are extracted, they are identified through a feature classifier 22. The feature classifier 22 classifies all of the features provided thereto by the feature extraction processor. For example, if the feature extraction processor extracts from the image an object in the shape of a person, then the feature classifier classifies the feature as a person. It should be appreciated that although the feature extraction processor 20 and the feature classifier 22 are shown as separate blocks in FIG. 1, in practice these two functions may be performed in a single processor.

The feature classifier 22 then provides the classified features to a tag assignment processor 24 which assigns a descriptor or tag to the classified features. The individual features are augmented so that higher-order objects or events may be recognized. Tags are then generated for these identified objects/events which enable the building of a index for rapid retrieval. The tag may for example, identify the time, date and media source of the feature as well as a description such as "Man with brown hair." An exemplary tag is shown and described in conjunction with FIGS. 1A and 1B. Each feature which is extracted from the image receives such a tag.

The tags are then stored in a tag repository 26. The repository may be provided, for example, as a database (e.g. an ORACLE 10g R2—Light database). By storing the tags rather than the raw data itself in the repository, the repository can be interrogated rapidly for situation/scene understanding. With such a system, it is possible to use a search engine 28 to form queries using such as "find all information streams which include a white van at 10 AM on January 19th." The raw data is stored in a separate data repository 30 and the search engine 28 identifies the raw data which can then be presented to a user through a user interface 32. The user interface allows a user to define search criteria 34 and present results 36.

Figure 1A:
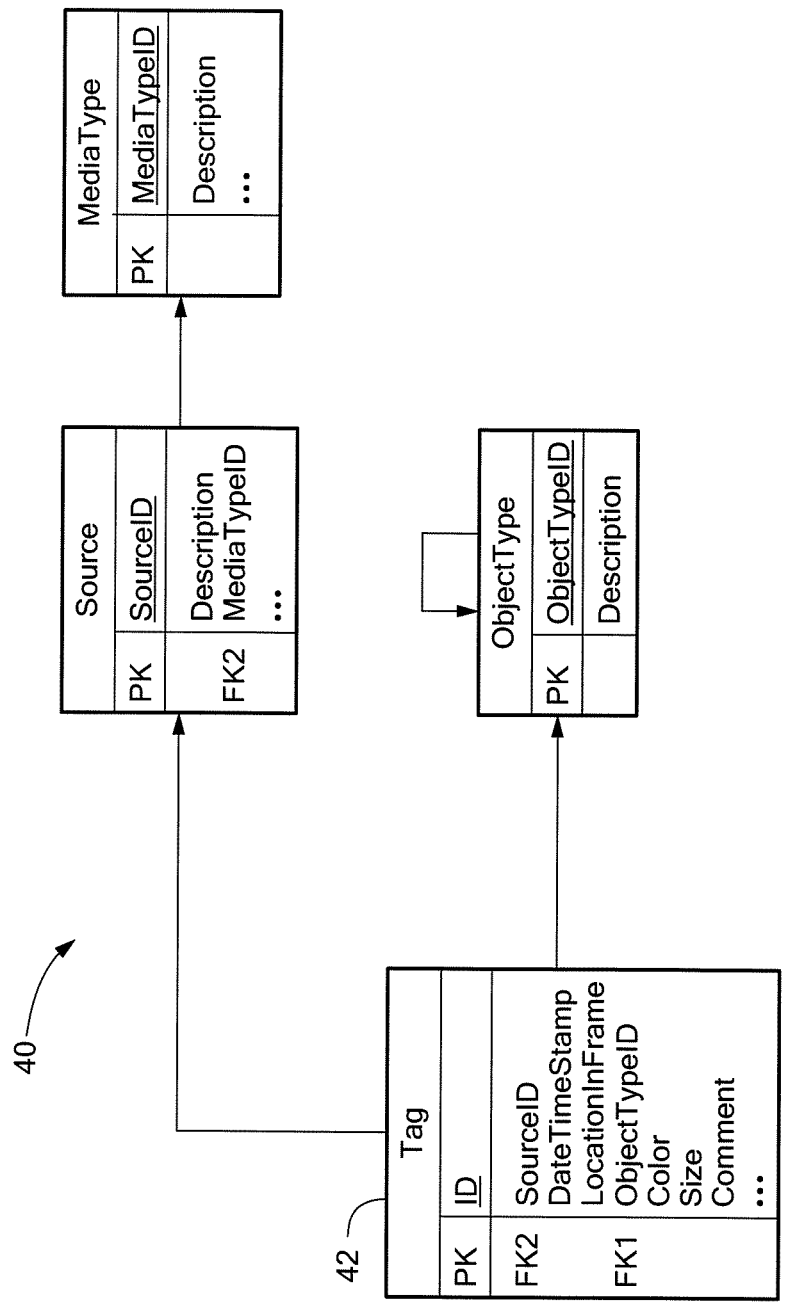
FIGS. 1A, 1B are exemplary diagrams of a tag and related information.
Figure 1B:
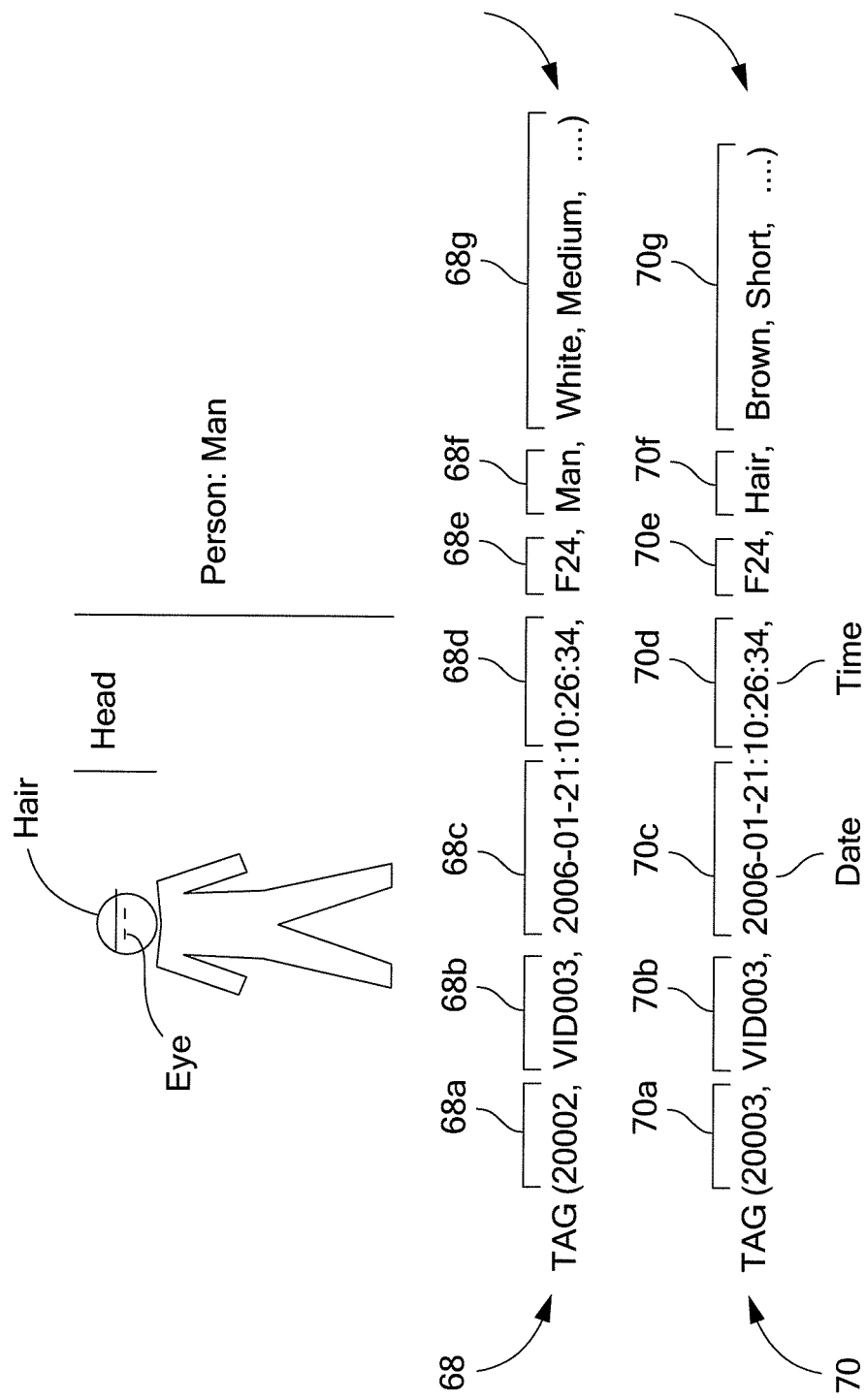

Referring briefly to FIGS. 1A and 1B, an exemplary tag data structure 40 (FIG. 1A) is shown. Other data structures may of course also be used. It should be appreciated that the goal of the system is to provide a tag 42 for everything in the data set. This is distinguished from those systems which specify an object or item or feature in a data set and then search the data set for that particular object or item or feature. The tags 42 are organized to identify the type of object, assign a surrogate ID, location, and date time of capture by the sensor, and provide detailed characteristics which define the object e.g. if human male/female, height, build, race, hair/no hair, beard, . . . , . The tags can be nested, where lower order tags are used by higher order tags.

Referring to FIG. 1B, the segmentation system has extracted a number of objects (or features) from a segment of a video sequence. In a preferred embodiment of the system, each of the objects receives a tag. In this example, the segmentation system has identified the following objects: person, head, hair and eye. Each of the objects receives a tag with two such tags 68, 70 being shown in FIG. 1B with tag 68 being the tag for the person and tag 70 being the tag for the hair.

Each tag 68 may include a plurality of fields including but not limited to a source ID field, a media type field, a date field, a time field, a location in a frame of a video sequence field, an object type field and a characteristics field.

For example, tag 68 includes a source ID 68a, a media type 68b, a date 68c, a time 68d, a location in a frame of the video sequence 68e, an object type 68f and characteristics of the person 68g.

Similarly, tag 70 includes a source ID 70a, a media type 70b, a date 70c, a time 70d, a location in a frame of a video sequence 70e, an object type 70f and characteristics of the hair 70b. The tags are provided a surrogate id number. The tags themselves can have a number of fields depending on the type of object or event that has been recognized.

It should also be appreciated that various tagging technologies which are the same as or similar to those provided by TECH/REP INC. OBJECT VIDEO, and IOIMAGE may be used in whole or in part and that ontology extensions of such tags (video, audio, textual, etc) are preferably added. Such ontology extensions may be the same as or similar to the type provided in the known Semantic Border Security Model.

The tags for the recognized objects and events will be stored in a repository. The ontology may be utilized to detect abnormal states and allow for forensic analysis of prior events for cause and actors. In one embodiment, the system accepts video input (e.g. from a video surveillance system) and process processes the data fed thereto (e.g. the video images) in such a manner that it may be used to: (a) conduct forensic analysis of the information (who was involved, where actors were) and (b) predict behavioral anomalies (incident may be in formation). This is a simple but very important idea that can be applied to homeland security and C2 campaigns such as PIDS, NEO and PSDS2.

Figure 2:
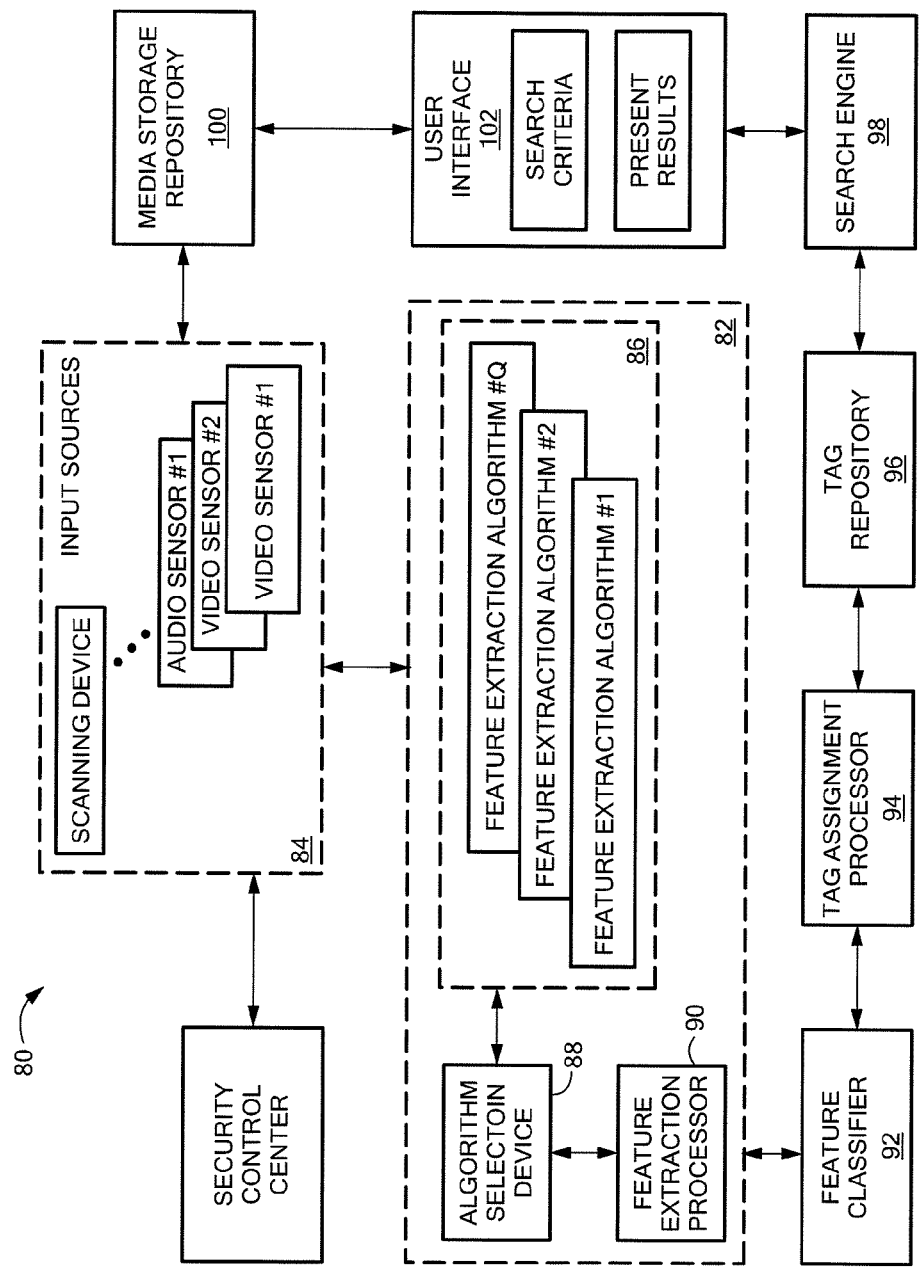
FIG. 2 is a block diagram of an alternate embodiment of a system for detecting and classifying features within data and storing a feature identifier in a repository.

Referring now to FIG. 2, a system for processing data 80 includes a segmentation system 82 which receives input data from a plurality of input sources 84. In this exemplary embodiment, the input sources 84 include, but are not limited to, video sensors, audio sensors and a scanning devices including but not limited to one or more of an X-ray, scanner, a magnetic resonance imaging (MRI) scanner or a computed tomography (CT) scanner. Other types of input sources may, of course, also be used.

The segmentation system includes a plurality of different feature extraction algorithms 86 and an algorithm selection device 88. Based upon the type of data provided to the segmentation system, the algorithm selection device selects an appropriate one (or ones) of the plurality of feature extraction algorithms to process the data provided to the segmentation system. Thus, if an input source 84 provides video data to the segmentation system 82, the algorithm selection device 88 selects an appropriate video signal processing technique to process the data. It should be appreciated that several video signal processing techniques may be available for use and the algorithm selection device selects an appropriate one of the processing techniques. The particular technique selected by the algorithm selection device is based upon a variety of factors including but not limited to: (1) the type of input to be processed (e.g. video signals, audio signals, still images, data from CT, X-ray or MRI scanners); (2) whether it is desirable to detect a particular feature within the data being processed; (3) whether the data has a known characteristic which dominates the data; and (4) the type of data (e.g. media files, text files/streams). For example, if night time video is being processed, then it may be desirable for the algorithm selection device to select a processing technique which effectively processes night time images since darkness will be a dominant characteristic in the video. On the other hand, if day time video is being processed, then it may be desirable to use another processing technique.

Once the algorithm selection device selects a feature extraction algorithm, a feature extraction processor 90 executes the algorithm and processes the input data in accordance with the algorithm. The feature extraction processor operates to identify all features in the data given limitations in available resources such as processing power, algorithm effectiveness, etc. . . . .

Once the features in the data are extracted, they are identified through a feature classifier 92. The feature classifier classifies all of the features provided thereto by the feature extraction processor. The feature classifier then provides the classified features to a tag assignment processor 94 which assigns a descriptor or tag to the classified features. An exemplary tag is shown and described in conjunction with FIG. 1B. Each feature which is extracted from the image receives a tag.

The tags are then stored in a tag repository 96. The repository may be provided, for example, as a database. By storing the tags rather than the raw data itself in the repository, the repository can be interrogated rapidly (e.g. by a search engine 98) for situation/scene understanding. The raw data is stored in a separate media storage repository 100 and the search engine identifies the raw data which can then be presented to a user through a user interface 102.

Figure 3:
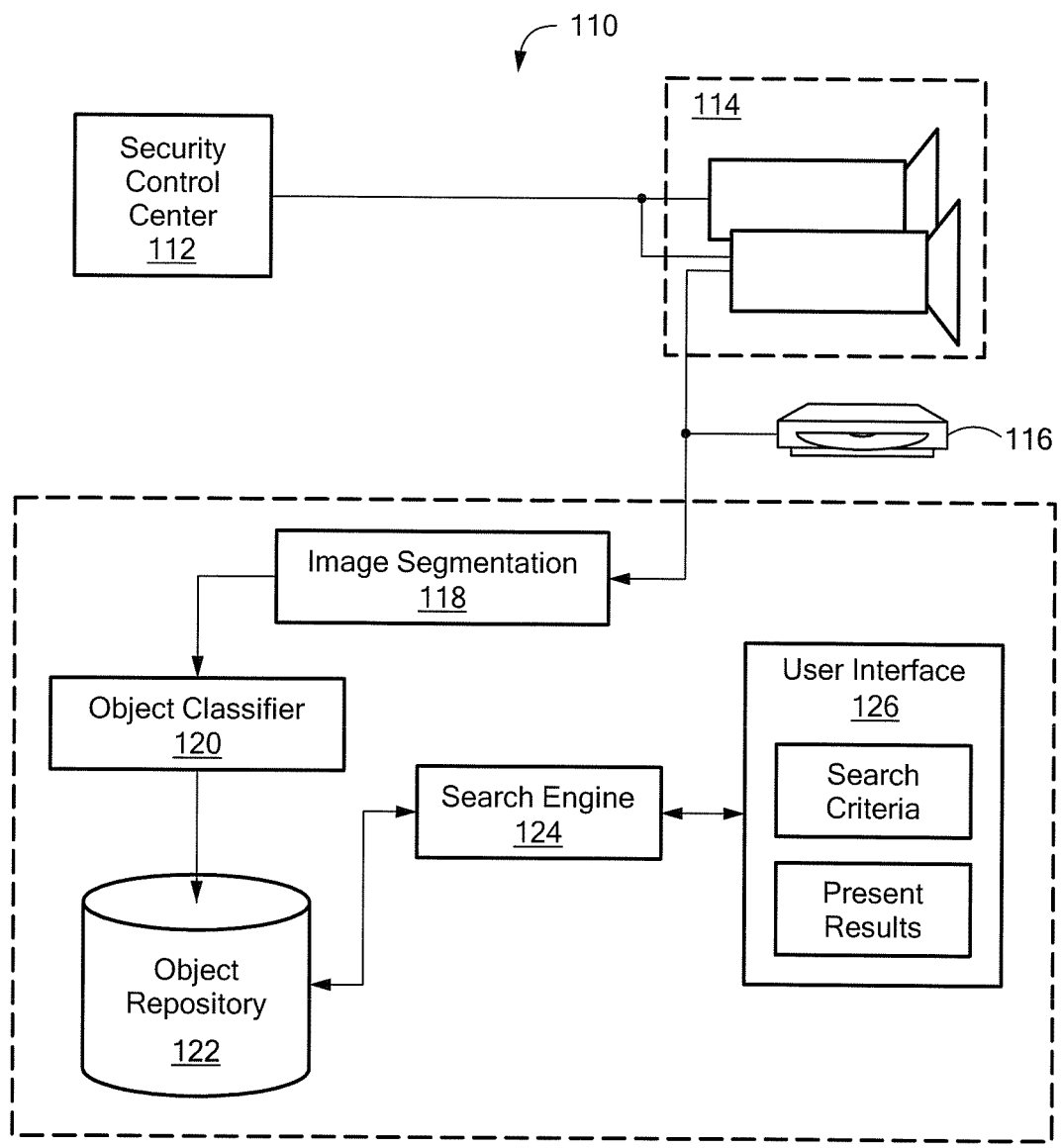
FIG. 3 is a block diagram of a system for processing media sequences to identify objects and to store object identifiers in a repository.

Referring now to FIG. 3, a system 110 for extracting object information automatically from media sequences and storing the extracted information in a repository to allow for rapid retrieval of source sequence and related sequences is shown.

In this system, a security control center 112 receives video images from multiple cameras, multiple video sensors or other imaging sources generally denoted as 114. The imaging sources may also store the video information being generated (and optionally recorded) in a video file 116 (e.g. Audio Video Interleave or "AVI" or MPEG files) in the event that later retrieval is required.

A video signal is provided (e.g. from sources 114, files 116, or from some other source) to one or more image segmentation algorithms 118 (including optical character recognition (OCR) algorithms) and then provided to an object classifier 120. The image segmentation algorithms 118 and object classifiers 120 identify objects in the images, classify them and then tag the data. The tags can be added to known ID7 metadata streams for example.

The tags are then stored in an object repository 122. The tags stored in the object repository identify objects, events, locations, media sequences and also include timestamps. A search engine 124 is used to search the object repository 122 in response to search criteria entered through a user interface 126. Once the search engine locates the desired information, the information is presented to the user through the user interface. It should be appreciated that the approach illustrated in the exemplary embodiment of FIG. 3 can be used for any type of media including but not limited to image, video and audio.

Figure 4:
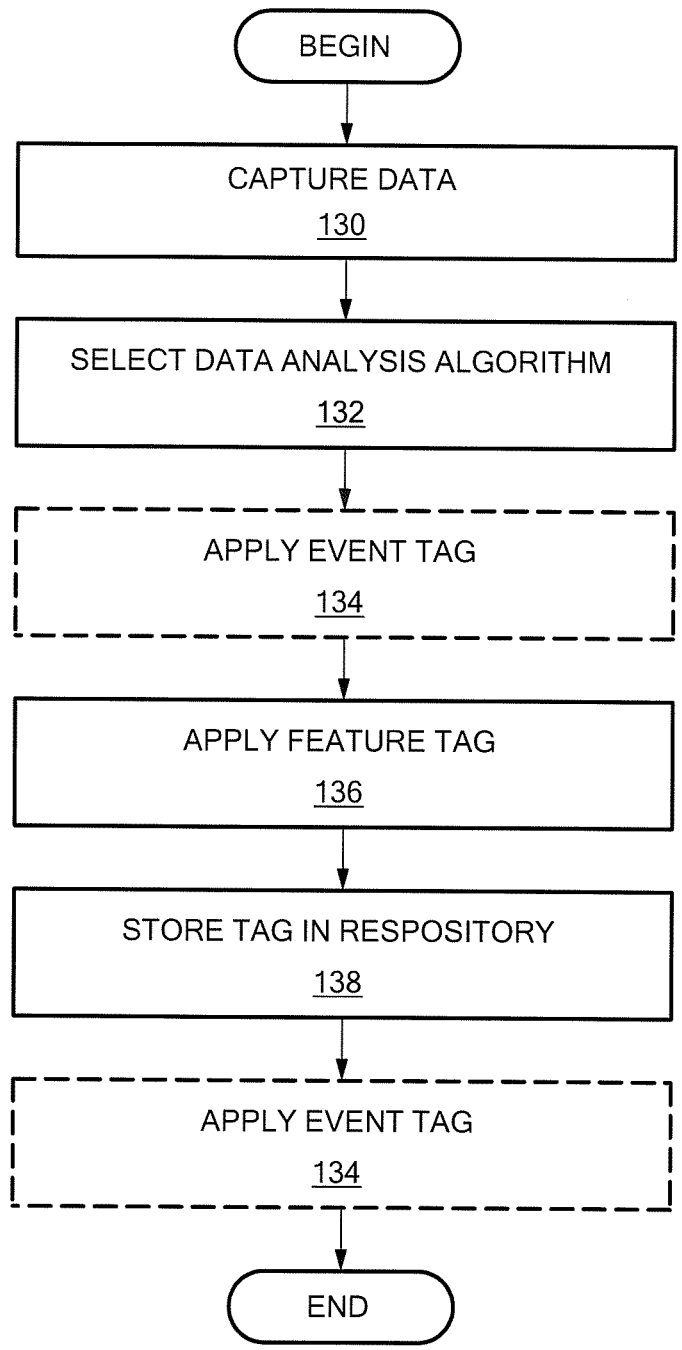
FIG. 4 is flow diagram of a method for storing data in a repository.

Referring now to FIG. 4, a process for storing information in a repository begins by capturing data as shown in processing block 130. The data may be captured using any type of sensor. The data is not limited to image, video or audio data. Rather, any type of data which may be measured by any type of sensor may be captured.

As shown in processing block 132, in response to the type of data which is captured, an appropriate one or more of a plurality of different data analysis algorithms is selected to analyze the data. For example, if the data is video data, then a video analysis algorithm is used. If the data is audio data, the an audio signal analysis algorithm is used. In short, the algorithm(s) best suited for the task is/are selected.

As shown in processing block 134, in some embodiments, an event tag may be applied either manually or automatically to the data. The event tag processing may be omitted in some embodiments (i.e. in some cases, it may not be desirable or practical or even possible to apply an event tag to data). And, as can be seen in FIG. 4, the event tag processing may occur at or near the beginning of the process or at or near the end of the process.

Processing then proceeds to processing block 136 in which a feature tag is automatically applied to the data. That is, features of the data are identified and then the feature(s) is/are included in a tag associated with the data. The particulars of each feature tag will vary depending upon the type of data being analyzed. If the data is an image for example, then features of the image may correspond to objects within the image or colors within the image. Features of an audio signal may correspond to male voice, female voice, or a characteristic such as yelling or whispering.

In processing block 138, the feature tags and event tags (if any) are stored in a tag repository. This can be within an eXtensible Markup Language (XML), object or relational (or some other) database as is deemed suitable. The raw data (from the sensors or media streams) is stored in a separate repository.

Having described preferred embodiments of the invention it will now become apparent to those of ordinary skill in the art that other embodiments incorporating these concepts may be used. Accordingly, it is submitted that that the invention should not be limited to the described embodiments but rather should be limited only by the spirit and scope of the appended claims.

The invention claimed is:

1. A data processing system comprising:
a segmentation system adapted to receive data, said segmentation system including:
(a) a storage device having a plurality of different feature extraction techniques stored therein;
(b) a feature extraction processor in communication with said storage device, said feature extraction processor adapted to execute at least each of the plurality of different feature extraction techniques stored in said storage device and adapted to extract one or more features from the data provided to said segmentation system; and
(c) a feature extraction technique selector which selects one or more of the plurality of different feature extraction techniques based upon the type of data provided to said segmentation system;
a feature classifier adapted to receive one or more features from said segmentation system and to apply a feature tag to each of the features wherein the feature tag comprises a source identifier (ID) field, a media type field, a date field, a time field, an object type field and a characteristics field and wherein the media type field is capable of specifying that the media is one of a plurality of disparate types of media including at least: image media, video media and audio media;
a repository adapted to receive feature tags from said feature classifier;
a search engine coupled to said repository; and
a user interface coupled to said search engine.

2. The system of claim 1 wherein:
said segmentation system is provided as an image segmentation system;
said storage device is provided as a memory;
said plurality of different feature extraction techniques stored in said memory are provided as image feature extraction techniques;
said feature extraction processor is provided as an image segmentation processor adapted to execute a plurality of different image feature extraction techniques;
said feature classifier is adapted to receive one or more image segments from said image segmentation processor; and
said repository is provided as a database.

3. The system of claim 1 wherein each feature is a subset of a data segment and wherein said segmentation processor is adapted to combine features to make higher order segments of a picture or audio stream.

4. A system comprising:
an image segmentation system including:
(a) a storage device having a plurality of different feature extraction techniques stored therein;
(b) an image segmentation processor in communication with said storage device, said image segmentation processor adapted to execute at least each of the plurality of different image segmentation algorithms stored in said storage device;
an object classifier adapted to receive one or more image segments from said image segmentation processor and to apply a tag to each object in each of the image segments wherein said tag comprises a source identifier (ID) field, a media type field, a date field, a time field, an object type field and a characteristics field and wherein the media type field specifies that the media is one of a plurality of disparate types of media including at least: image media, video media and audio media;
an object repository adapted to receive object tags from said object classifier;
a search engine coupled to said object repository; and
a user interface coupled to said search engine.

5. The system of claim 4 further comprising a tag repository and wherein the tag applied to each object by said object classifier is stored in said tag repository.

6. A method for processing data comprising:
selecting a portion of the data;
identifying one or more specific features within the selected portion of the data;
applying a feature tag to each of the specific features which have been identified wherein the feature tag comprises a source identifier (ID) field, a media type field, a date field, a time field, an object type field and a characteristics field and wherein the media type field specifies that the media is one of a plurality of disparate types of media including at least: image media, video media and audio media; and
storing each of the feature tags in a repository.

7. The method of claim 6 further comprising applying an event tag to the selected portion of the data.

8. The method of claim 7 wherein applying an event tag to the selected portion of the data comprises one of:
(a) manually applying an event tag to the selected portion of the data; or
(b) automatically applying an event tag to the selected portion of the data.

9. A computer-implemented method, comprising:
receiving data from a source;
selecting one or more feature extraction techniques to process the data based on a particular type of the data received from the source;
extracting, by the selected one or more feature extraction techniques, all identifiable features from the data;
applying a tag to each extracted feature of the data based on an identification of the feature during the extracting, each tag indicating where within the data the corresponding extracted feature is located and each said tap comprising a media type field and wherein the media type field specifies that the media is one of a plurality of disparate types of media including at least: image media, video media and audio media; and storing the tags for each extracted feature in a repository that is searchable by the tags.

10. The method of claim 9 wherein selecting is based on whether it is desirable to detect a particular feature within the data.

11. The method of claim 9 wherein selecting is based on whether the data has a known characteristic which dominates the data.

12. The method of claim 9 further comprising searching the repository based on one or more tags to determine associated data locations having an extracted feature matching the searched tags.

13. The method of claim 9 further comprising:
combining extracted features to make higher order extracted features; and
applying higher order tags to the higher order extracted features.

14. The method of claim 9 each tag indicates a time or a period of time within the data when the corresponding extracted feature is located.

15. The method of claim 9 further comprising utilizing ontology of the extracted features to detect abnormal states within the data.

16. The method of claim 9 wherein the data is selected from a group consisting of: video, day time video, night time video, audio, still images, computed tomography (CT) scans, X-ray scans, magnetic resonance imaging (MRI) scans, seismic data, radio frequency (RF) data, and text.

* * * * *